United States Patent
McNair

(10) Patent No.: US 6,435,617 B1
(45) Date of Patent: Aug. 20, 2002

(54) VEHICLE HEAD AND NECK REST

(76) Inventor: Curtis G. McNair, 1373 Cauthen Dr., Rockingham, NC (US) 28379

( * ) Notice: Subject to any disclaimer, the term of this patent is extended or adjusted under 35 U.S.C. 154(b) by 0 days.

(21) Appl. No.: 09/812,374

(22) Filed: Mar. 20, 2001

(51) Int. Cl.[7] .................................................. A47C 7/36
(52) U.S. Cl. ...................................................... 297/397
(58) Field of Search ................................. 247/391, 397

(56) References Cited

U.S. PATENT DOCUMENTS

| | | | |
|---|---|---|---|
| 3,608,964 A | | 9/1971 | Earl |
| 4,097,086 A | | 6/1978 | Hudson |
| 4,114,948 A | * | 9/1978 | Perkey |
| 4,154,478 A | * | 5/1979 | Cohune |
| 4,165,125 A | | 8/1979 | Owen |
| 5,154,477 A | | 10/1992 | Lacy |
| 5,330,255 A | | 7/1994 | Stawicki |
| 5,345,633 A | * | 9/1994 | Harnish |
| 5,503,456 A | | 4/1996 | Rossini |
| 5,538,323 A | | 7/1996 | Henkel |
| 5,544,378 A | * | 8/1996 | Chow |
| 5,964,504 A | * | 10/1999 | Hogan et al. |
| 5,967,613 A | * | 10/1999 | McKeever |
| 6,010,192 A | | 1/2000 | King |
| 6,123,389 A | * | 9/2000 | O'Connor et al. |
| 6,299,248 B1 | * | 10/2001 | Gennaro et al. |

* cited by examiner

*Primary Examiner*—Milton Nelson, Jr.
(74) *Attorney, Agent, or Firm*—Dale J. Ream

(57) ABSTRACT

A head and neck rest includes a cushion of soft, resilient material having flat top, bottom, and back sides with flat side walls. A front side of the cushion has a pair of adjacent convex portions contoured to support a neck of a vehicle passenger therebetween. An edge connecting the front and top sides is beveled to support a passenger's head. A swivel plate is pivotally attached to the cushion back side and is rotatable about a fastener. First and second straps are attached to the swivel plate and extend in opposed directions at user-selected angles relative to the axis of the fastener. The straps may be selectively secured together with a buckle. Thus, the straps may be positioned for securing the cushion to vehicle seat backrests or headrests of various configurations.

16 Claims, 6 Drawing Sheets

VEHICLE HEAD AND NECK REST

BACKGROUND OF THE INVENTION

This invention relates generally to passenger head supports and, more particularly, to a head and next rest having a cushion contoured to support a passenger's neck and head and that may be universally secured to vehicle seat backrests or headrests of various configurations.

Seats of a vehicle such as an automobile, bus, or airplane, typically provide insufficient support to a passenger's neck and head. Various devices have been proposed in the art for supporting a passenger's head for the purpose of sleeping while riding in the vehicle. Although assumably effective for their intended purposes, existing devices do not provide a head and neck rest for supporting the head and neck of an alert passenger, such as a driver. More significantly, existing devices cannot be conveniently attached to the myriad of vehicle seat configurations, including backrests and headrests.

Therefore, it is desirable to have a head and neck rest that may be selectively secured to the backrest of a vehicle seat or to a headrest of the vehicle seat. Further, it is desirable to have a head and neck rest having straps that may conveniently be configured to extend vertically or horizontally about a seat headrest, or at any other angle necessary to provide secure attachment. In addition, it is desirable to have a head and neck rest which supports the neck of a vehicle passenger.

SUMMARY OF THE INVENTION

A head and neck rest according to the present invention includes a cushion constructed of a resilient material and having flat top, bottom, and back sides with upstanding side walls extending between the top and bottom sides. A front side includes a pair of convex portions that are spaced apart and contoured to receive and support a neck of a vehicle passenger therebetween. A beveled edge between top and front sides of the cushion is contoured to support a passenger's head.

A swivel plate is pivotally mounted to the back side of the cushion for rotation thereabout. A pair of straps are attached to opposed edges of the swivel plate and are releasably securable together with a buckle. As the swivel plate is rotated about the fastener, the straps extend in opposed directions at user-selected angles relative to an axis defined by the fastener. In other words, the straps may be extended horizontally, vertically, or at a selected angle therebetween for securing the cushion to a vehicle seat backrest or headrest. Therefore, the head and neck rest may be positioned upon a seat having virtually any configuration or construction and is specifically contoured to support the neck and head of a passenger, whether alert or asleep. Having a head and neck rest that is conveniently securable to the head rests of vehicle seats is needed since conventional headrests typically require a passenger to significantly tilt his head backward in an uncomfortable position, especially if the seatback is already tilted backward.

Therefore, a general object of this invention is to provide a head and neck rest having a contoured cushion for supporting the neck and head of a vehicle passenger.

Another object of this invention is to provide a head and neck rest, as aforesaid, which is securable to backrests and headrests of vehicle seats of various configurations.

Still another object of this invention is to provide a head and neck rest, as aforesaid, which aids in the relaxation of a passenger on long trips.

Yet another object of this invention is to provide a head and neck rest, as aforesaid, in which securing straps are coupled to a swivel plate on the back of the cushion so as to be configured as desired for extending vertically or horizontally about a vehicle headrest.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

A head and neck rest according to the present invention will now be described with reference to FIGS. 1–6 of the accompanying drawings. One embodiment of a head and neck rest 10 includes a cushion 12 constructed of a soft and yieldably resilient material such as foam rubber or other conventional pillow materials. The outside of the cushion may be covered with a soft polyester fleece or other material that is soft to the touch. The cushion 12, as a whole, includes a generally rectangular configuration although the contour of a front side 22 gives the cushion a B-shaped appearance, as to be described below.

Figure 1:
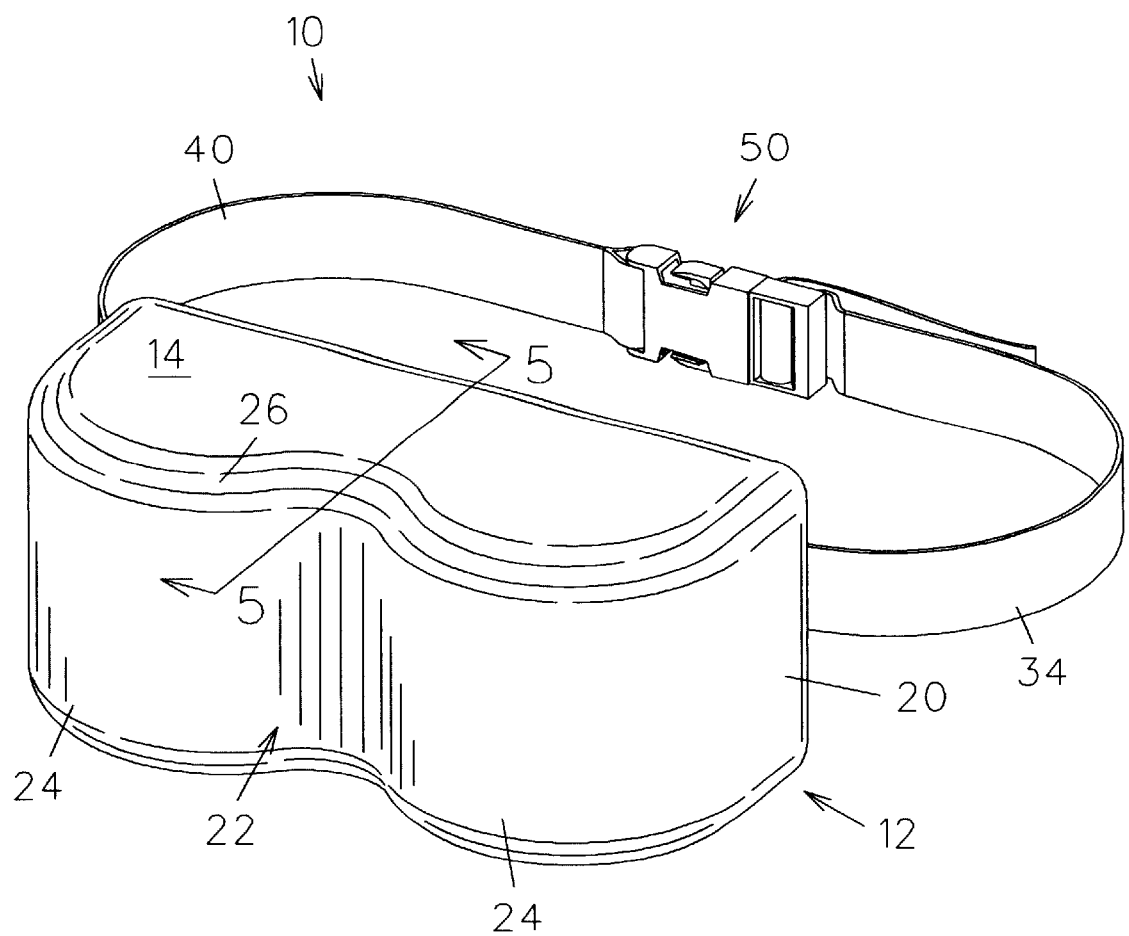
FIG. 1 is a front perspective view of a head and neck rest according to a preferred embodiment of the present invention.
Figure 2:
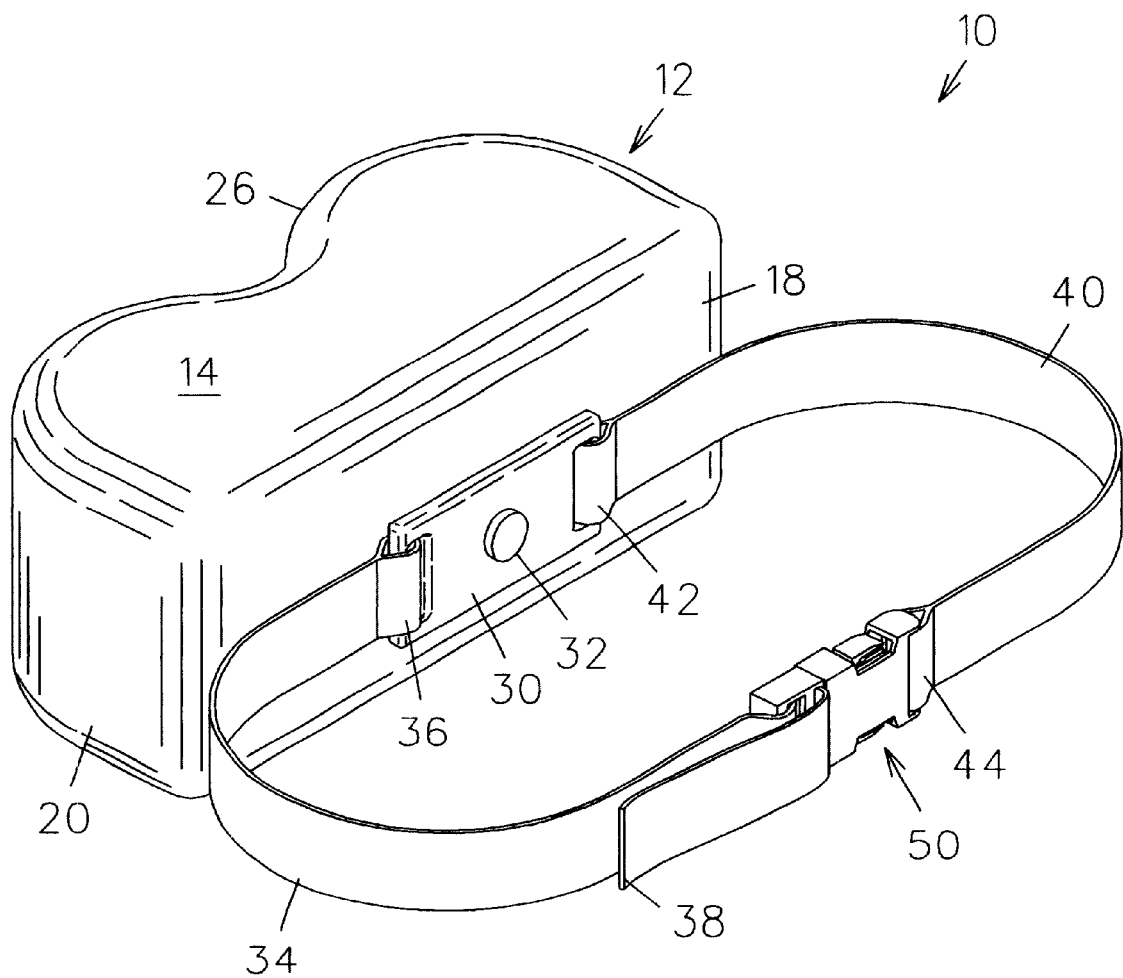
FIG. 2 is a rear perspective view of the device as in FIG. 1 with the buckle in a fastened configuration.

As shown in FIGS. 1 and 2, the cushion 12 includes parallel planar top 14 and bottom 16 sides with a planar back side 18 extending therebetween. Opposed parallel side walls 20 also extend between top 14 and bottom 16 sides, the side walls 20 being normal to the back side 18. The front side 22 of the cushion 12 includes a pair of convex portions 24 adjacent one another and contoured to receive and support a neck of a vehicle passenger therebetween. The edge 26 between the top 14 and front 22 sides includes a gradually beveled or rounded configuration suitable for supporting the occipital region of the head of a passenger. The flat bottom side 16 may rest upon the shoulders of a passenger if positioned accordingly, as to be further described below.

Figure 5:
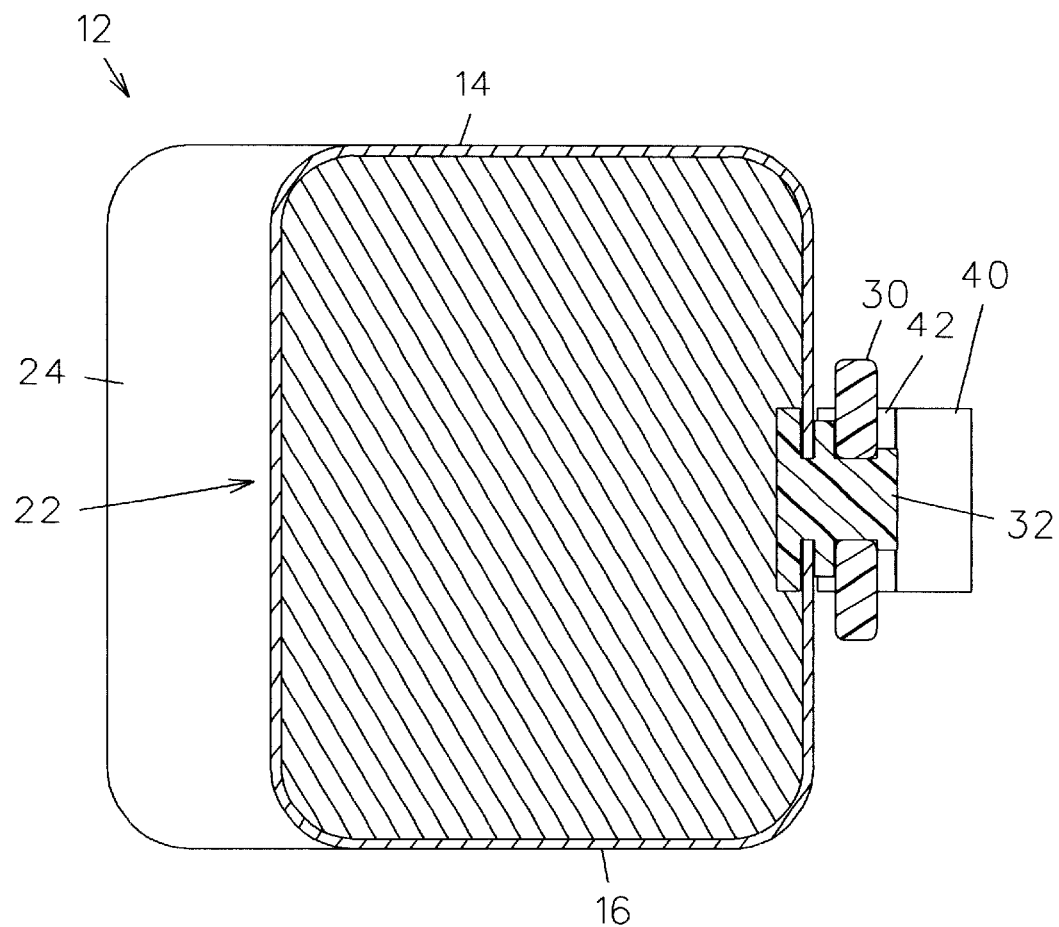
FIG. 5 is a sectional view of the device taken along line 5—5 of FIG. 1.

A rectangular swivel plate 30 is pivotally mounted to the back side 18 of the cushion 12 with a fastener 32 such as a grommet although a bolt or pin would also work (FIGS. 2 and 5). The swivel plate 30 includes opposing side edges and is adapted to rotate about the fastener. The fastener 32 includes a shaft that defines an imaginary axis normal to the back side 18 of the cushion 12. The head and neck rest 10 further includes first 34 and second 40 straps, each strap having first 36, 42 and second 38, 44 ends, respectively. First ends 36, 40 of the first 34 and second 40 straps are fixedly attached to respective opposed side edges of the swivel plate 30. More particularly, the first ends 36, 40 are looped through slots formed in the swivel plate 30 adjacent the side edges (FIG. 2). Therefore, the first 34 and second 40 straps extend in opposed directions relative to the side edges.

Figure 3:
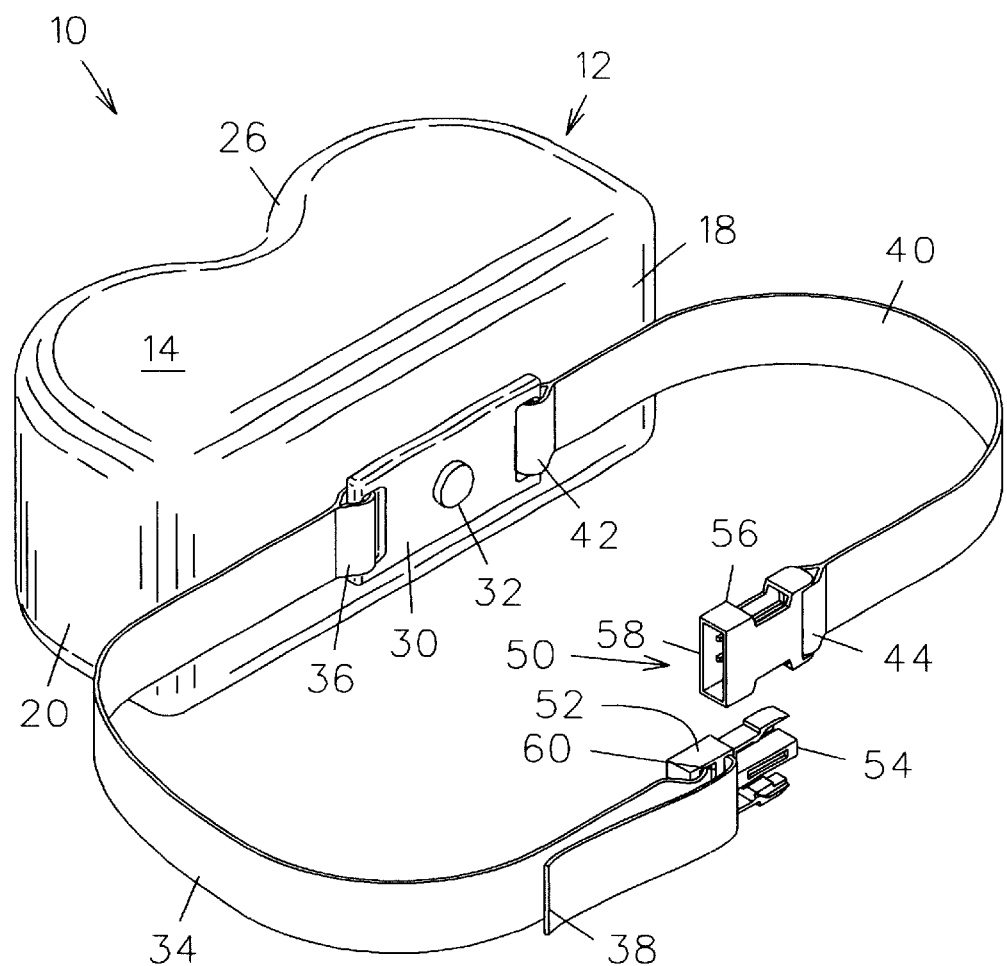
FIG. 3 is a rear perspective view of the device as in FIG. 2 with the buckle in an unfastened configuration.
Figure 4:
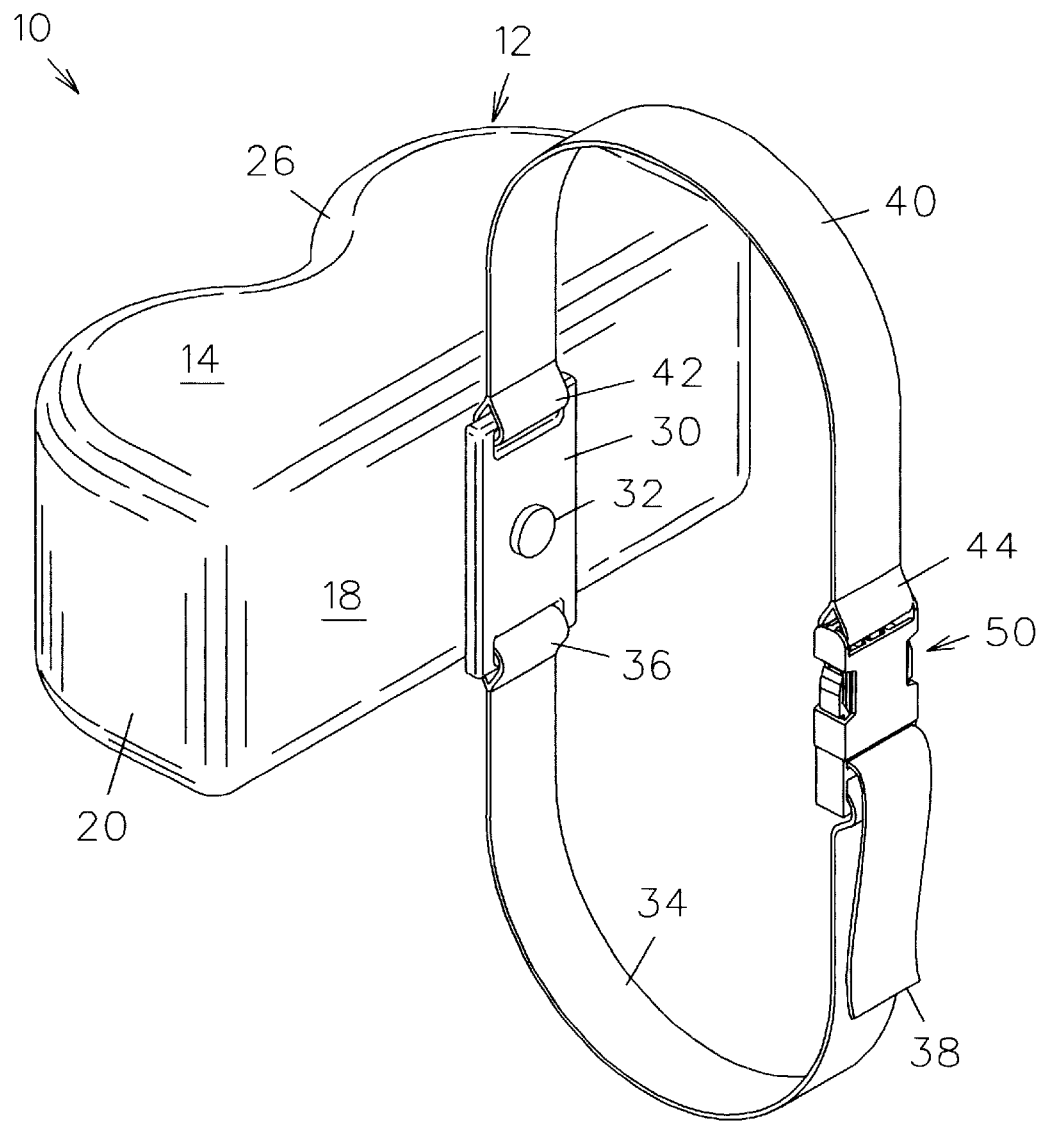
FIG. 4 is a rear perspective view of the device as in FIG. 2 with the swivel plate rotated 90°.

The second ends 38, 44 of the first 34 and second 40 straps may be secured together with a buckle 50 (FIG. 2). More particularly, a first buckle member 52 is connected to the first strap 34 adjacent the second end 38 thereof and includes a male component 54. Similarly, a second buckle member 56 is connected to the second end 44 of the second strap 40 and includes a female component 58. These buckle members 52, 56 are adapted to be releasably secured together (FIGS. 2 and 3). The first buckle member 52 further includes strap take-up slots 60 such that the length of the first strap 34 extending between the first buckle member 52 and the swivel plate 30 may be adjusted by a user.

In use, the head and neck rest 10 may be secured to any vehicle seat, such as the backrest of an automobile, bus, airplane, or the like. To secure the head and neck rest 10 to a vehicle seat backrest, the cushion 12 is positioned with the back side 18 thereof bearing against the backrest at the desired location. The cushion 12 may even be positioned such that the bottom side 16 rests partially on the shoulders of a user. The first 34 and second 40 straps are extended horizontally around the backrest and fastened together with the buckle. Similarly, the head and neck rest 10 may be secured to a headrest of a vehicle seat such as the headrests that are common in automobiles. If the vehicle headrest is in a retracted configuration, the back side 18 of the cushion 12 may be placed against the front side of the headrest and the first 34 and second 40 straps may extended horizontally around the headrest and may be releasably coupled together. However, a user may desire the headrest to be extended upwardly so that the cushion 12 may be positioned at a higher vertical location. With the headrest extended, the back side 18 of the cushion 12 may be placed against the front side of the headrest and the straps may be extended either horizontally or vertically thereabout, or at any other angle, by rotating the swivel plate 30 about the fastener 32.

Figure 6:
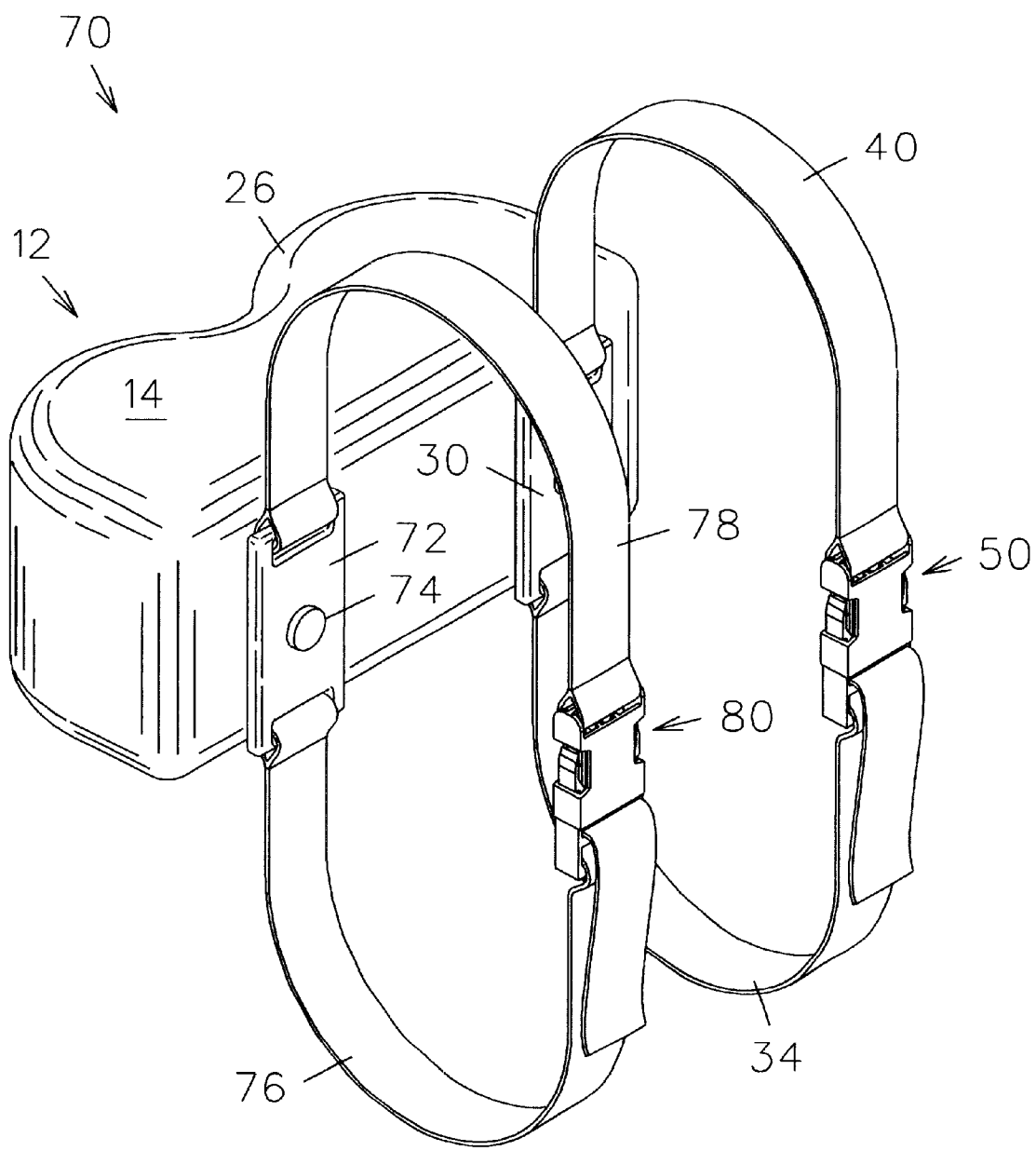
FIG. 6 is a rear perspective view of another embodiment of a head and neck rest according to the present invention.

Another embodiment of the head and neck rest 70 is shown in FIG. 6 and includes a construction substantially similar to that described previously except as specifically noted below. The swivel plate 30 is constructed in the same manner as previously described but is shifted laterally toward one side. This embodiment further includes a second swivel plate 72 pivotally mounted to the back side 18 of the cushion 12 with another fastener 74, the second swivel plate 72 having third 76 and fourth 78 straps secured thereto and being releasably fastenable to one another with a another buckle 80. The second swivel plate 72 is laterally spaced from the first swivel plate 30 such that both swivel plates may be rotated to a configuration in which first 34 and second 40 straps and third 76 and fourth 78 straps may be vertically extended about a headrest and secured together. This configuration is especially advantageous where a vehicle seat headrest extends or retracts upon a single rod and the straps may be extended on both sides thereof.

It is understood that while certain forms of this invention have been illustrated and described, it is not limited thereto except insofar as such limitations are included in the following claims and allowable functional equivalents thereof.

What is claims is:

1. A head and neck rest for supporting a head and neck of a passenger of a vehicle, comprising:
    a generally B-shaped cushion constructed of a yieldably resilient material and having planar top and bottom sides with parallel side walls extending therebetween, said cushion including a planar back side and a front side having a pair of convex portions adjacent one another and contoured to support a neck of a vehicle passenger therebetween,
    first and second straps, each strap having a first end coupled to said back side of said cushion and a second end;
    a first buckle member connected to said second end of said first strap and a second buckle member connected to said second end of said second strap for releasably securing said first strap to said second strap;
    whereby said straps may be selectively extended about a backrest of a vehicle seat for releasably securing said cushion to a front side of said vehicle seat backrest; and
    means for adjusting the length of said first strap extending between said first buckle member and said back side of said cushion.

2. The head and neck rest as in claim 1 wherein said first buckle member includes a male component and said second buckle member includes a female component, said male and female components being configured to be releasably coupled together.

3. The head and neck rest as in claim 1 further comprising a swivel plate pivotally coupled to said back side of said cushion, respective first ends of said first and second straps being fixedly attached to opposed edges of said swivel plate such that said first and second straps extend in user-selected opposed directions relative to said cushion.

4. The head and neck rest as in claim 3 wherein said swivel plate is pivotally coupled to said back side of said cushion with a fastener that defines an imaginary axis normal to said back side, a rotation of said swivel plate about said fastener causing said straps to extend in opposed directions at user-selected angles relative to said imaginary axis.

5. The head and neck rest as in claim 4 wherein said straps may be extended vertically about a headrest of a vehicle seat for securing said cushion to a front side of said headrest.

6. The head and neck rest as in claim 4 wherein said straps may be extended horizontally about a headrest of a vehicle seat for securing said cushion to a front side of said headrest.

7. The head and neck rest as in claim 4 wherein said straps may be extended horizontally about said vehicle backrest for securing said cushion to said front side thereof.

8. A head and neck rest for use with a seat of a vehicle for supporting a head and neck of a passenger of said vehicle, said head and neck rest comprising:
    a generally rectangular cushion constructed of a resilient material and having a flat back side adapted to bear against a front side of a headrest of a vehicle seat and a front side contoured to support the neck of a vehicle passenger;
    a swivel plate pivotally coupled to said back side of said cushion and having opposed side edges;
    first and second straps, each strap having a first end connected to a respective opposed edge of said swivel plate and having a second end; and
    a buckle having a male component connected to said first strap and a female component connected to said second end of said second strap, said female component of said buckle adapted to be releasably secured to said male component of said buckle.

9. The head and neck rest as in claim 8 wherein said buckle includes means for adjusting the length of said first strap extending between said buckle and said swivel plate.

10. The head and neck rest as in claim 8 wherein said swivel plate is coupled to said back side of said cushion with a fastener for rotation thereabout, said fastener defining an imaginary axis normal to said back side of said cushion such that a rotation of said swivel plate about said fastener causes said straps to extend from said swivel plate in opposed directions at user-selected angles relative to said imaginary axis.

11. The head and neck rest as in claim 8 wherein said straps may be extended vertically about said vehicle headrest for securing said cushion to said front side thereof.

12. The head and neck rest as in claim 8 wherein said straps may be extended horizontally about said vehicle headrest for securing said cushion to said front side thereof.

13. The head and neck rest as in claim 8 further comprising:
- a second swivel plate pivotally coupled to said back side of said cushion and spaced from said first swivel plate, said second swivel plate having opposed side edges;
- third and fourth straps each having a first end coupled to a respective opposed side edge of said second swivel plate and having a second end; and
- a second buckle having a male component connected to said third strap and a female component connected to said second end of said fourth strap, said female component of said second buckle adapted to be releasably secured to said male component of said second buckle.

14. The head and neck rest as in claim 13 wherein said second-swivel plate is coupled to said back side of said cushion with another fastener for rotation thereabout, said another fastener defining an imaginary axis normal to said back side of said cushion such that a rotation of said second swivel plate about said another fastener causes said third and fourth straps to extend from said second swivel plate in opposed directions at user-selected angles relative to said imaginary axis of said another fastener.

15. The head and neck rest as in claim 8 wherein said cushion further comprises planar top and bottom sides extending between said front and back sides with parallel side walls extending therebetween, said front wall having a pair of convex portions adjacent one another and spaced apart so as to support a neck of a passenger therebetween.

16. The head and neck rest as in claim 15 further comprising an edge between said top side and said front side having a beveled configuration adapted to support a head of a passenger.

* * * * *